(12) United States Patent
Xu

(10) Patent No.: US 10,145,091 B2
(45) Date of Patent: Dec. 4, 2018

(54) EASY-TO-INSTALL TAP STRUCTURE

(71) Applicant: Jianhua Xu, Qingyuan (CN)

(72) Inventor: Jianhua Xu, Qingyuan (CN)

( * ) Notice: Subject to any disclaimer, the term of this patent is extended or adjusted under 35 U.S.C. 154(b) by 21 days.

(21) Appl. No.: 15/317,310

(22) PCT Filed: Jun. 8, 2015

(86) PCT No.: PCT/CN2015/080965
§ 371 (c)(1),
(2) Date: Mar. 17, 2017

(87) PCT Pub. No.: WO2015/188730
PCT Pub. Date: Dec. 17, 2015

(65) Prior Publication Data
US 2017/0218603 A1     Aug. 3, 2017

(30) Foreign Application Priority Data

Jun. 9, 2014 (CN) .................... 2014 2 0304580 U
Mar. 12, 2015 (CN) .................... 2015 2 0142112 U

(51) Int. Cl.
*E03C 1/04* (2006.01)
*F16K 27/06* (2006.01)
(Continued)

(52) U.S. Cl.
CPC ............ *E03C 1/0403* (2013.01); *F16K 11/08* (2013.01); *F16K 27/06* (2013.01); *F16L 15/08* (2013.01)

(58) Field of Classification Search
CPC ......... E03C 1/0403; F16L 15/08; F16K 27/06
See application file for complete search history.

(56) References Cited

U.S. PATENT DOCUMENTS 3,136,570 A * 6/1964 Lee ..................... E03C 1/042
                                                                    137/360
4,667,987 A * 5/1987 Knebel ................. E03C 1/0403
                                                                    285/124.4
(Continued)

FOREIGN PATENT DOCUMENTS

CN        87206364 U      3/1988
CN        200949702 Y     9/2007
(Continued)

OTHER PUBLICATIONS

International Search Report (PCT/ISA/210) dated Sep. 17, 2015, by the State Intellectual Property Office of the P.R. China as the International Searching Authority for International Application No. PCT/CN2015/080965.
(Continued)

*Primary Examiner* — Craig Schneider
*Assistant Examiner* — Angelisa L Hicks
(74) *Attorney, Agent, or Firm* — Buchanan Ingersoll & Rooney PC

(57) ABSTRACT

An easy-to-install tap structure includes a tap body, a pipe joint and a connecting pipe for communicating the tap body with the pipe joint. The connecting pipe is arranged between the tap body and the pipe joint. When the tap structure is used for a wash basin, there is no need to connect a braided hose; in the process of replacing a tap, there is no need to replace the pipe joint and the connecting pipe, so that the pipe joint and the connecting pipe can be used many times; and when the tap is dismounted, the tap body can be directly rotated, and when the tap is mounted, the connecting pipe is directly adjusted to rotate until the water outlet of the tap is arranged in the correct direction.

17 Claims, 14 Drawing Sheets

(51) Int. Cl.
*F16K 11/08* (2006.01)
*F16L 15/08* (2006.01)

(56) References Cited

U.S. PATENT DOCUMENTS

| | | | | |
|---|---|---|---|---|
| 6,368,503 | B1* | 4/2002 | Williamson | E03C 1/04 210/282 |
| 8,851,109 | B2* | 10/2014 | Ibsen | F16K 31/60 137/315.18 |
| 2004/0261853 | A1* | 12/2004 | Jennings | E03C 1/042 137/360 |
| 2008/0277003 | A1* | 11/2008 | Mueller | E03C 1/0401 137/801 |
| 2012/0153673 | A1* | 6/2012 | De Luca | B62D 25/087 296/193.04 |

FOREIGN PATENT DOCUMENTS

| | | |
|---|---|---|
| CN | 201359129 Y | 12/2009 |
| CN | 102434687 A | 5/2012 |
| CN | 204083566 U | 1/2015 |
| DE | 4125570 A1 | 2/1992 |
| JP | 2002323153 A | 11/2002 |

OTHER PUBLICATIONS

Written Opinion (PCT/ISA/237) dated Sep. 17, 2015, by the State Intellectual Property Office of the P.R. China as the International Searching Authority for International Application No. PCT/CN2015/080965.

\* cited by examiner

EASY-TO-INSTALL TAP STRUCTURE

TECHNICAL FIELD

The present application relates to the technical field of taps, and more particularly, relates to an easy-to-install tap structure.

BACKGROUND

A tap is a common water outlet component in daily life, it is connected to a water supplying pipe by a pipe joint, such that water in the water supplying pipe can be controlled by the tap to flow out for use, or the water does not flow out when the tap is locked. The tap is used in home and other various places, such as basins and kitchens.

Referring to FIG. 1, one end of a pipe joint 1' is provided with an inner thread 11', and an end of a tap 2' is provided with an outer thread 21', such that the connection between the tap 2' and the pipe joint 1' can be realized by the connection between the inner thread 11' and the outer thread 21'.

In the prior art, a connection structure 1 between the tap and the water supplying pipe has following defects during assembly and disassembly processes:

1) It is inconvenient to assemble and disassemble and complex to operate; because space where the tap 2' and the pipe joint 1' are mounted is limited, both the assembly and disassembly processes require a professional person to use professional tools, the operation space is limited, and thus the problem of inconvenient and complex operation is caused; for example, in a basin structure, a weave hose needs to be operated under a basin; for a wall-hung cold and hot water dual-use tap, two curved angle connections are needed, and the distance between two curve angles is limited, which is more difficult than the assembly of a basin.

2) When mounting the tap 2', water tapes should be wrapped around a surface of the outer thread 21'; water may leak if the water tape is too thin; if the water tape is too thick, it will be difficult to be swirled and mounted into the inner thread 11' and exposure of the water tape will bring bad appearance.

3) A service life of a weave hose is limited; if a weave hose needs to be replaced in a cold and hot water dual-use tap, an undamaged tap requires being disassembled, it requires more time and effort than the first assembly.

4) During the assembly of the tap 2', the following problem may often occur: after the tap 2' is connected to the pipe joint 1' and locked, a water outlet of the tap 2' is usually hard to be arranged directly downward, and may generate a deflection phenomenon; many adjustments are needed such that the water outlet barely reaches a position facing directly downward, and the operation is very complex.

5) For a pipe joint mounted inside a wall, the water supplying pipe will be broken in the wall if too much locking force is applied to the pipe joint 1' by a tool such as a wrench, and the surface of the tap 2' will be subjected to a certain damage if the force is applied improperly or the tools don't work well.

Technical Problem

A purpose of the present invention is to provide an easy-to-install tap structure, aiming at solving the problem in the prior art that a tap is not easy to mount, the assembly cost is high, and many adjustments are needed.

BRIEF SUMMARY

To solve the above-mentioned problem, the technical solution of the invention is to provide an easy-to-install tap structure, which comprises a tap body and a pipe joint, and further comprises a connecting pipe arranged inside the tap body and the pipe joint and connecting the tap body with the pipe joint, the tap body has a connection end, a first inner thread is provided on the connection end, the pipe joint has an interface end, a second inner thread is provided in the interface end, a first outer thread and a second outer thread are provided on a first end and a second end of the connecting pipe respectively, the first outer thread is connected with the first inner thread, the second outer thread is connected with the second inner thread, an auxiliary element configured for assisting the mounting of the tap body is provided in the interface end of the pipe joint, the auxiliary element has a third outer thread matching with the second inner thread, the auxiliary element is located in the vicinity of the second end of the connecting pipe, a socket through which an auxiliary tool can be inserted to drive the auxiliary element is provided on an end of the auxiliary element away from the second end of the connecting pipe.

Optionally, the connecting pipe is shaped as a straight sleeve, thread pitches of the first outer thread and the second outer thread are different, and a spacing is provided between the second inner thread and the end face of the interface end.

Optionally, the connecting pipe has a big end and a small end, the first outer thread is provided on the big end and the second outer thread is provided on the small end, or the first outer thread is provided on the small end and the second outer thread is provided on the big end.

Optionally, the tap body has a hot water channel and a cold water channel independent from each other, the pipe joint has a first cavity and a second cavity independent from each other, the first cavity is provided correspondingly to the hot water channel, and the second cavity is provided correspondingly to the cold water channel.

Optionally, the second cavity is flared from bottom to top (per the orientation of FIG. 9) from top to bottom, a top opening of the second cavity is circular, the cold water channel is flared from top to bottom, and a bottom opening of the cold water channel is circular and connected to a top opening of the second cavity.

Optionally, an end face of the connection end of the tap body is abutted against an end face of the interface end of the pipe joint, an annular sealing groove is provided on the end face of the interface end of the pipe joint, and the annular sealing groove is filled up with a seal ring.

Optionally, there are two annular sealing grooves including a big circular sealing groove and a small circular sealing groove, one channel of the hot water channel and the cold water channel is located inside, and the other channel is located outside; the small circular sealing groove surrounds the inside channel, and the big circular sealing groove surrounds the outside channel; there are two sealing rings including a big seal ring and a small seal ring, the big seal ring is provided in the big circular sealing groove, and the small seal ring is provided in the small circular sealing groove.

Optionally, a filter is provided in any one of the first cavity, the second cavity, the hot water channel and the cold water channel.

Optionally, the pipe joint is a three-way pipe, a straight pipe or a bending pipe.

Optionally, a bayonet configured to be welded with a metal basin is annularly provided on an outer wall of the pipe joint.

Beneficial Effects

In the tap structure of the invention, a connecting pipe is provided between a tap body and a pipe joint; when assembling and disassembling the tap structure, a professional person using professional tools is unnecessary, the cost is low, and the operation is easy and convenient; the tap doesn't need to be connected by a weaved hose when being used in a basin, and does not need a curved angle connection when being used as a wall-hung cold and hot water dual-use shower tap; water tapes are unnecessary when the pipe joint is connected with the tap body by the connecting pipe, and during the replacement process of the tap, the pipe joint and the connecting pipe don't need to be replaced and can be used repeatedly; the tap body can be rotated directly during the disassembly of the tap, and during the assembly of the tap, the connecting pipe can be directly adjusted to rotate until the water outlet of the tap is arranged toward the correct direction.

10—tap body;
11—water outlet end;
12—connection end;
13—first inner thread;
14—hot water channel;
15—cold water channel;
20—pipe joint;
21—interface end;
22—second inner thread;
23—spacing;
24—seal ring;
25—auxiliary element;
251—third outer thread;
252—fixing block;
253—socket;
26—first cavity;
27—second cavity;
28—straight cavity section;
29—corner section;
30—connecting pipe;
31—first outer thread;
32—second outer thread;
33—filter;
34—big end;
35—small end;
40—adjuster;
41—screw hole;
212—big annular sealing groove;
213—small annular sealing groove;
201—fifth outer thread;
202—outer thread;
50—decorative nut;
60—ceramic chip;
211—bayonet;
70—metal basin

DETAILED DESCRIPTION OF THE PREFERRED EMBODIMENT

In order to make the purpose, the technical features and the advantages of the present application be clearer, the present application will be described in detail with reference to accompanying drawings and embodiments. It should be understood that the specific embodiments described herein are used for interpretation of present invention merely, rather than the limitation to the present invention.

It should be noted that an element can be provided on another element directly or an intermediate element may exist at the same time when the element is described as being fixed or provided on the another element, and an element can be connected with another element directly or an intermediate element may exist at the same time when the element is described as being connected with the another element.

It should also be noted that the orientation terms used in these embodiments, such as left, right, top and bottom, are merely relative concepts to each other or refer to the normal using state of a product, but should not be considered as any limitation sense.

In the tap structure of the invention, a connecting pipe is provided between a tap body and a pipe joint, when assembling and disassembling the tap structure, a professional person using professional tools is unnecessary, the cost is low and the operation is easy and convenient. The tap doesn't need to be connected by a weaved hose and can be connected directly to an inlet pipe of the tap water when being used in a basin. The pipe joint and the connecting pipe don't need to be replaced and can be used repeatedly during the replacement process of the tap, the tap body can be rotated directly during the assembly and disassembly of the tap, the connecting pipe can be directly adjusted to rotate until the water outlet of the tap is arranged toward the correct direction.

The embodiments of the present invention will be described in detail accompanying with drawings hereinafter.

Embodiment One

Figure 1:
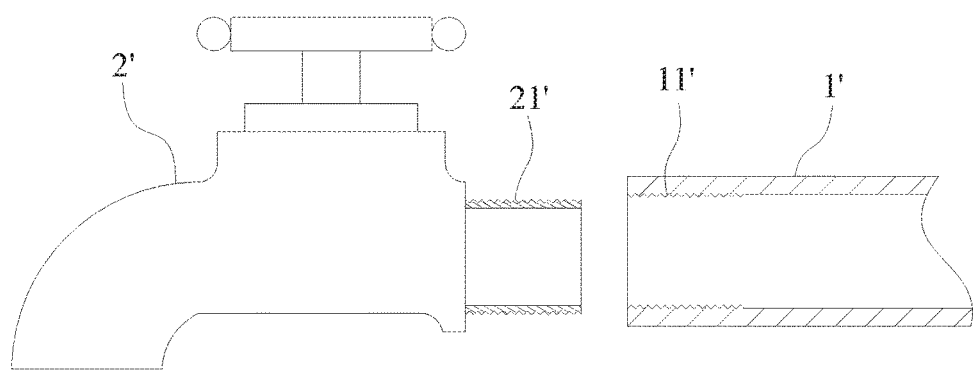
FIG. 1 is an exploded view of a tap structure in the prior art.
Figure 2:
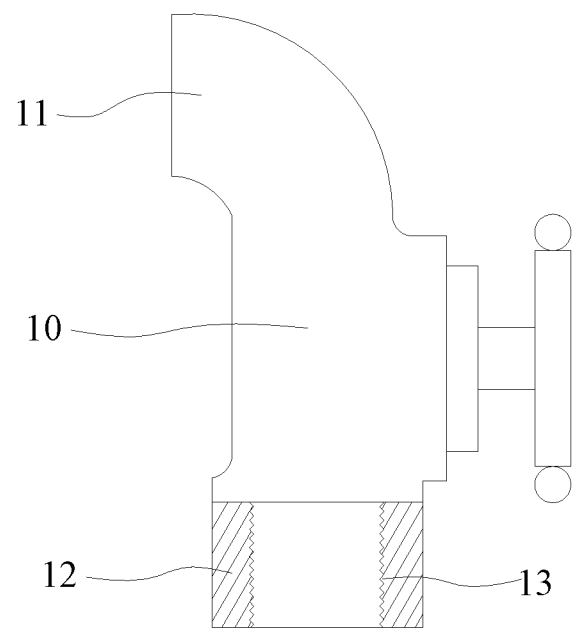
FIG. 2 is a cut exploded view of an easy-to-install tap structure in a first embodiment of the present invention.
Figure 2:
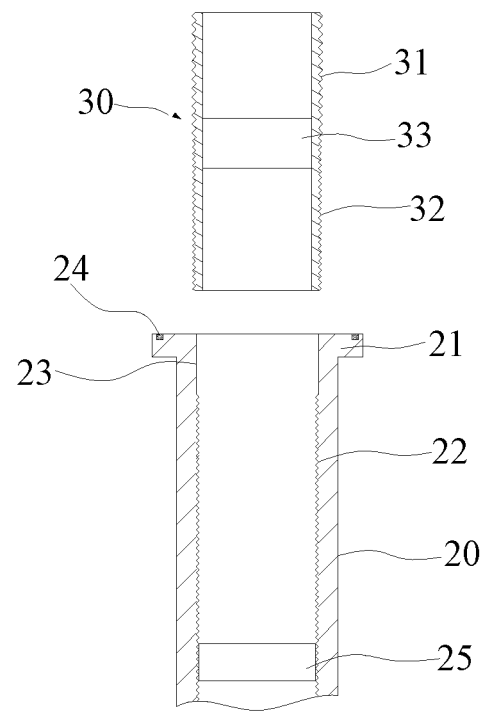

Referring to FIG. 2, a first embodiment provides a tap structure, which comprises a tap body 10 and a pipe joint 20, and further comprises a connecting pipe 30 for connecting the tap body 10 with the pipe joint 20; the tap body 10 has a water outlet end 11 and a connection end 12, a first inner thread 13 is provided in the connection end 12, the pipe joint 20 has an interface end 21, a second inner thread 22 is provided in the interface end 22, a first outer thread 31 and a second outer thread 32 are provided on a first end and a second end of the connecting pipe 30 respectively. The first outer thread 31 is connected to the first inner thread 13, the second outer thread 32 is connected to the second inner thread 22. In this way, by the cooperation between the two groups of the threads, the tap body 10 is connected with the pipe joint 20 by the connecting pipe 30.

In the embodiment, the connecting pipe 30 is formed as a straight sleeve, which means that the two ends thereof have the same size. However, in order that the tap body 10 can select its direction better within 360 degrees when the pipe joint 20 has already been fixed, thread pitches of the first outer thread 31 and the second outer thread 32 are different. It can be seen from FIG. 2 that the thread pitch of the first outer thread 31 is longer than that of the second outer thread 32. Of course, the thread pitch of the first outer thread 31 can also be shorter than the one of the second outer thread 32.

In the embodiment, the pipe joint 20 is a straight pipe, of course, the pipe joint 20 can be a three-way pipe or a bending pipe.

In the embodiment, an outer thread 202 is also provided outside of the pipe joint 20, so that the pipe joint 20 can be fixed with a basin by the outer thread 202.

It can be seen from FIG. 2 that, in the embodiment, a spacing 23 is provided between the second inner thread 22 and the interface end 21. That is, no thread is provided at the spacing 23; an angle of rotation of the tap body 10 is not constant when the tap body 10 is connected with the pipe joint 20 by the connecting pipe 30, such that engagement depth between the second outer thread 32 of the connecting pipe 30 and the second inner thread 22 in the pipe joint 20 is not different in each case; the first outer thread 31 of the connecting pipe 30 may be partially located in the pipe joint 20 when the second outer thread 32 is completely rotated into the second inner thread 22, the spacing 23 at which no thread is provided facilitates the protruding of the first outer thread 31.

In the embodiment, after the tap body 10 is connected with the pipe joint 20 by the connecting pipe 30, an end face of the connection end 12 of the tap body 10 will be abutted against an end face of the interface end 21 of the pipe joint 20; an annular sealing groove is provided on the end face of the interface end 21 of the pipe joint 20, and the annular sealing groove is filled up with a seal ring 24; by providing the seal ring 24, the sealing class between the tap body 10 and the pipe joint 20 can be improved, thereby avoiding water leakage at a contact surface when supplying water.

Preferably, in the embodiment, a filter 33 is provided in the connecting pipe 30, the filter 33 can be used for filtering impurities and foreign matters in water to improve the cleanliness of the water and further increase service life of valves in the tap body 10. Of course, the filter 33 can be also provided in the pipe joint 20 or the tap body 10.

Figure 3:
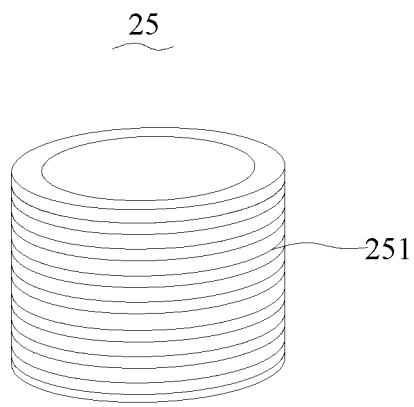
FIG. 3 is a structural schematic view of an auxiliary element in the first embodiment of the present invention.
Figure 4:
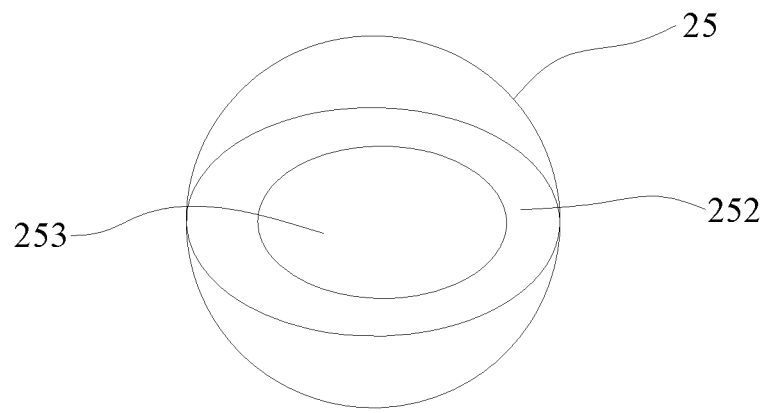
FIG. 4 is a bottom view of the auxiliary element in the first embodiment of the present invention.

Preferably, in the embodiment, an auxiliary element 25 configured for assisting the assembly of the tap body 10 is provided in the interface end 21 of the pipe joint 20. The auxiliary element 25 has a third outer thread 251 matching with the second inner thread 22, and the auxiliary element 25 is located in the vicinity of the second end of the connecting pipe 30. In combination with FIG. 3 and FIG. 4, the auxiliary element 25 is shaped as a hollow sleeve, the third outer thread 251 is provided on the outer surface of the auxiliary element 25, a fixing block 252 is provided in the center of an end of the auxiliary element 25 away from the second end of the connecting pipe, a socket 253 through which an auxiliary tool can be inserted to drive the auxiliary element 25 is provided on the fixed block 252. In the embodiment, the auxiliary tool can be any rod-like object which can pass through the socket 253, and no special tool is needed; for example, such as pencils, sticks, chopsticks and so on can be inserted into the socket 253 to drive the auxiliary element 25 to rotate, such that the auxiliary element 25 is located at different places in the second inner thread 22.

The water outlet end 11 of the tap body 10 should face directly to a basin during the first mounting or replacement of the tap body 10, however, in fact, the tap body 10 cannot always mounted at the desired position by one step during the mounting, and an incident that the water outlet end 11 of the tap body 10 does not face directly to the basin often happens. But in the embodiment, the auxiliary element 25 is provided for a pretest before the first mounting or replacement, such that the position of the water outlet end 11 of the tap body 10 is found, then the tap body 10 is mounted on the basin. The operation is convenient because the earlier pretest is not carried on the basin, and the pretest ensures that the tap body 10 can be mounted successfully in place by one step during the formal assembly on the basin.

Figure 5:
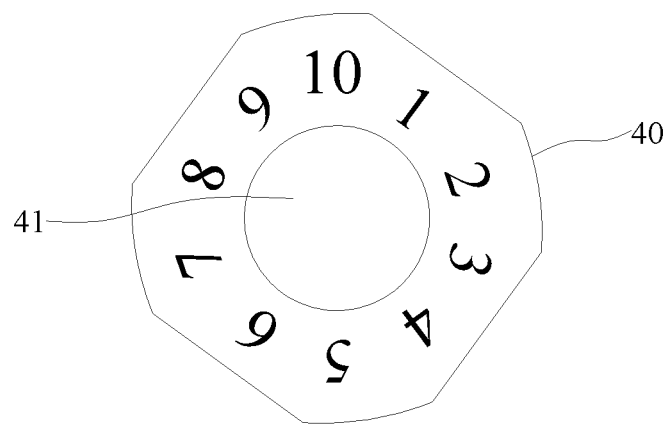
FIG. 5 is a top view of an adjuster in the first embodiment of the present invention.
Figure 6:
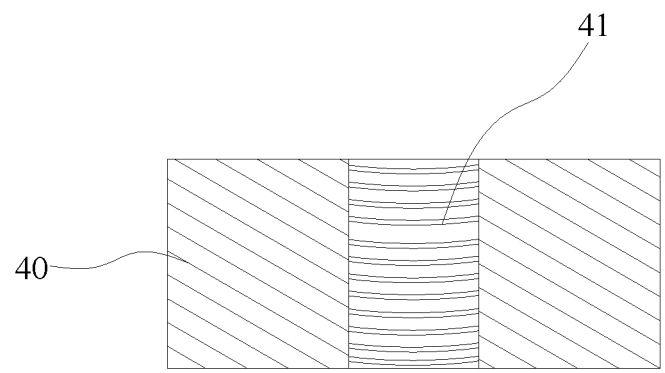
FIG. 6 is a cutaway view of the adjuster in the first embodiment of the present invention.

In the embodiment, a gauge as shown in FIG. 5 and FIG. 6 is required during the assembly, wherein the gauge is an adjuster 40. A screw hole 41 is provided in the center of the adjuster 40, the screw hole 41 matches with the first outer thread 31 of the connecting pipe 30. Furthermore, digital signs from one to ten are provided on a top end face of the adjuster 40 along the circumference thereof for the contraposition during the pretest.

When the adjuster 40 and the auxiliary element 25 are used for assembly, the auxiliary element 25 is firstly rotated into the bottom (per the orientation of FIG. 2) of the second inner thread 22, the connecting pipe 30 and the tap body 10 are respectively mounted to the pipe joint 20, a mark is made on a position of the pipe joint 20 where the water outlet end 11 of the tap body 10 directly faces to. The tap body 10 is then removed, the adjuster 40 is mounted onto the connecting pipe 30 by the cooperation between the screw hole 41 and the first outer thread 31. After the adjuster 40 is mounted in place, a number on the adjuster 40 directly facing to the mark of the pipe joint 20 is recorded, the adjuster 40 is loosened, an auxiliary tool such as a chopstick is inserted into the socket 253 to drive the auxiliary element 25 to move upward, and the adjuster 40 is tightened again; the auxiliary element 25 is repeatedly screwed and the adjuster 40 is repeatedly tightened until the number on the adjuster 40 faces directly to the mark on pipe joint 20, such that the direction of the water outlet 11 required by an user is got; now, because the auxiliary element 25 reaches the desired position and the auxiliary element 25 has limit effect, embedded length of the second outer thread 32 on the connecting pipe 30 into the second inner thread 22 is thereby limited; in this way, the connecting pipe 30 is limited and the screwing of the tap body 10 is further limited when the pipe joint 20 and connecting pipe 30 are formally mounted to the tap body 10, and thus the water outlet 11 of the tap body 10 faces directly to the basin after the assembly.

Embodiment Two

Figure 7:
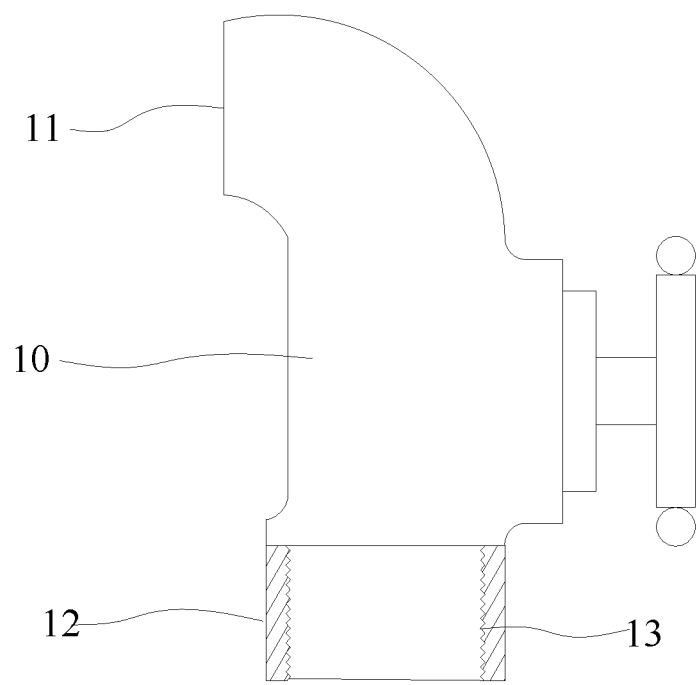
FIG. 7 is a cut exploded view cut of an easy-to-install tap structure in a second embodiment of the present invention.
Figure 7:
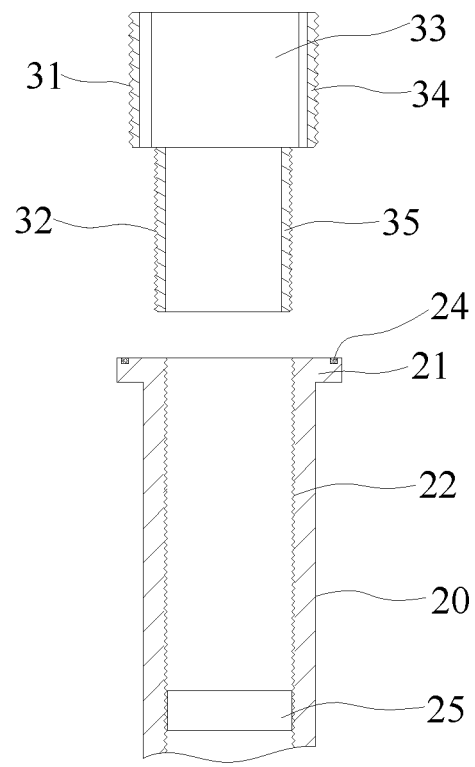

Referring to FIG. 7, a second embodiment of the invention provides a tap structure, compared with the first embodiment, the difference exists in the structure of the connecting pipe 30. In the embodiment, the connecting pipe 30 has a big end 34 and a small end 35, the first outer thread 31 is provided on the big end 34, and the second outer thread 32 is provided on the small end 35. Because pipe diameters of the big end 34 and the small end 35 are different and can be distinguished, thread pitches of the first outer thread 31 and the second outer thread 32 can identical and can also be different. Similarly, because pipe diameters of the big end 34 and the small end 35 are different, the big end 34 can't extend into the second inner thread 22, therefore, in a pipe joint 20, there is no spacing 23 between the second inner thread 22 and the end face of an interface end 21, which means that the second inner thread 22 is provided directly through the pipe joint 20.

Other structures in the embodiment are the same as that of the first embodiment, and are not described in detail herein.

Embodiment Three

Figure 8:
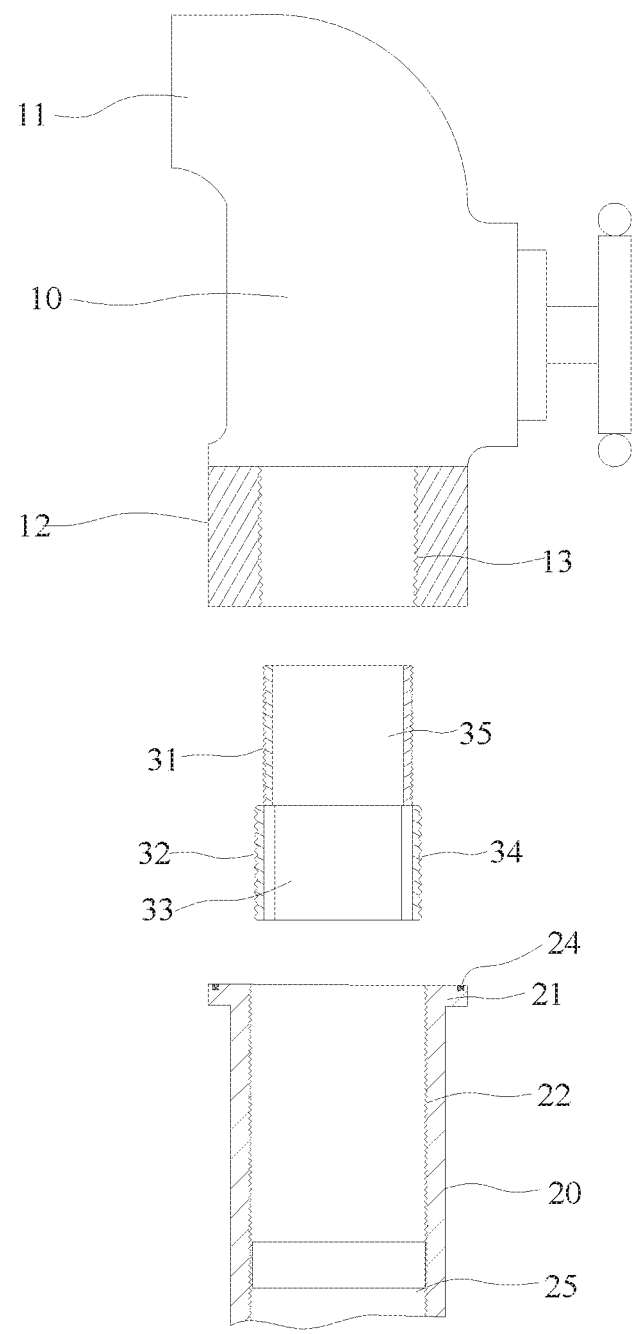
FIG. 8 is a cut exploded view cut of an easy-to-install tap structure in a third embodiment of the present invention.

Referring to FIG. 8, a third embodiment of the invention provides a tap structure, compared with the first embodiment, the difference exists in the structure of a connecting pipe 30 too. In the embodiment, the connecting pipe 30 has a big end 34 and a small end 35, the first outer thread 31 is provided on the small end 35, and the second outer thread 32 is provided on the big end 34. Similarly, because pipe diameters of the big end 34 and the small end 35 are different and can be distinguished, thread pitches of the first outer thread 31 and the second outer thread can be identical and can also be different. Similarly, in the embodiment, in a pipe joint 20, there is no the spacing 23 between the second inner thread 22 and the end face of an interface end 21, which means that the second inner thread 22 runs directly through the pipe joint 20.

Other structures in the embodiment are the same as that of the first embodiment, and are not described in detail herein.

Embodiment Four

Figure 9:
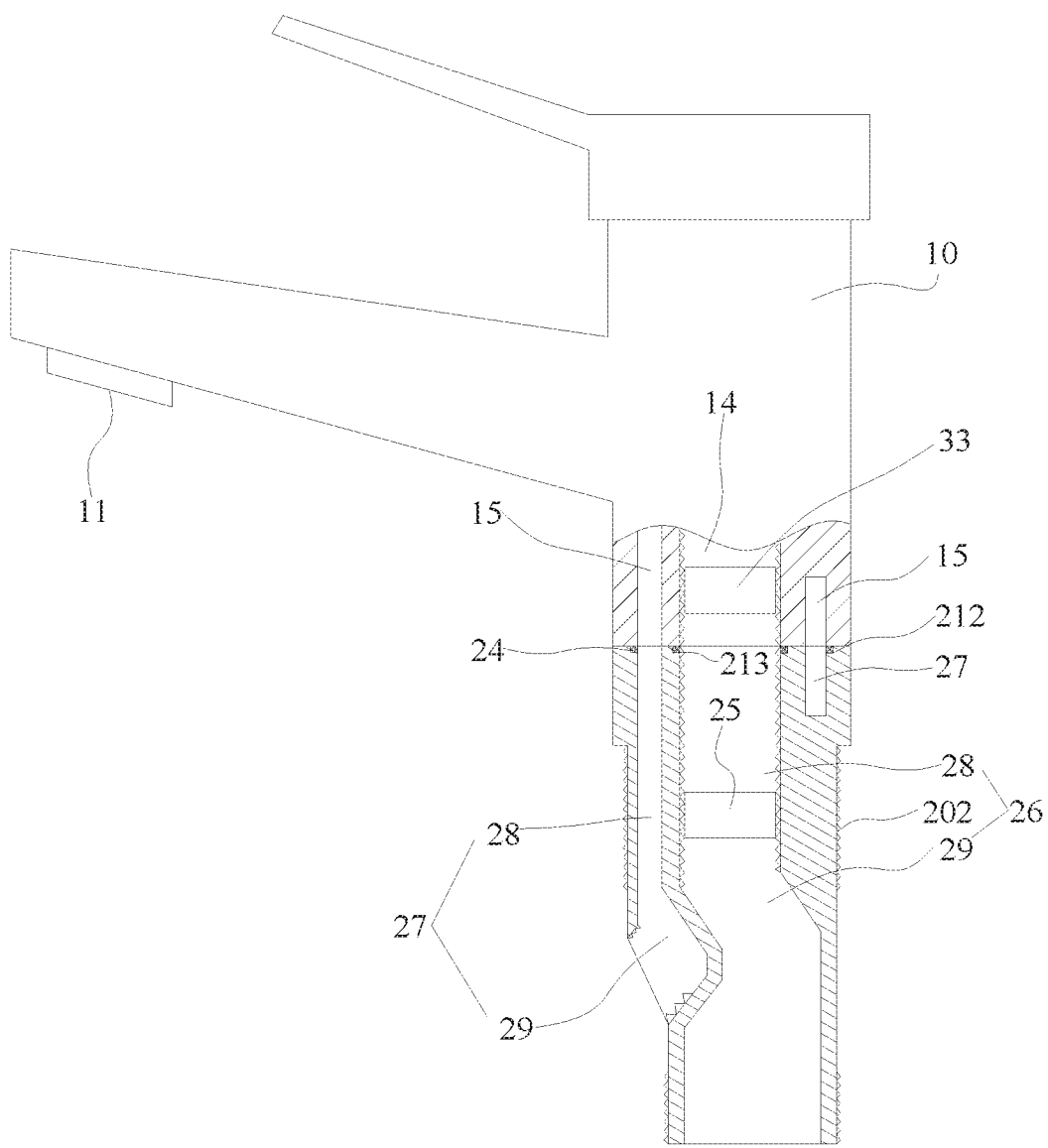
FIG. 9 is a cut view of an easy-to-install tap structure in a fourth embodiment of the invention.

Referring to FIG. 9, a fourth embodiment of the invention provides a tap structure, compared with the first embodiment, the structure of the tap body 10 is different, and accordingly, the structure of the pipe joint 20 is also different. In the embodiment, the tap body 10 has a hot water channel 14 and a cold water channel 15 independent from each other, the pipe joint 20 has a first cavity 26 and a second cavity 27 independent from each other, the first cavity 26 is provided correspondingly to the hot water channel 14, and the second cavity 27 is provided correspondingly to the cold water channel 15. The second cavity 27 is flared from bottom to top (per the orientation of FIG. 9), and a top opening of the second cavity 27 is circular. Similarly, the cold water channel 15 is flared from top to bottom, a bottom opening of the cold water channel 15 is circular and connected to the top opening of the second cavity 27.

In the embodiment, the two cavities of the pipe joint 20 are correspondingly connected with the two channels of the tap body 10 respectively, such that cold water and hot water in the water pipe can flow into the tap body 10, the tap doesn't need to be connected by a weaved hose and saves much cost. Besides, no professional tool is needed during the replacement of the tap body 10, the operation can be directly carried out on the basin, the pipe joint 20 and the connecting pipe 30 do not need to be replaced at the same time, and the pipe joint 20 and the connecting pipe 30 can be used for multiple times.

It can be seen from FIG. 9 that each of the first cavity 26 and the second cavity 27 includes a straight cavity section 28 and a corner section 29 connected to the bottom of the straight cavity section 28, the second inner thread 22 extends to the bottom of the straight cavity section 28, such that the connecting pipe 30 can be ensured to be rotated in the pipe joint 20.

In the embodiment, the auxiliary element 25 is provided in the straight section 28 of the first cavity 26. It can be seen from the figure that although a corner section 29 is provided at the bottom of the straight section 28, it has no influence on that objects such as pencils, sticks and chopsticks can be inserted into a socket 253 of the auxiliary element 25 to drive the auxiliary element 25 to rotate, such that the auxiliary element 25 can be located at different positions in the connecting pipe 30.

In the embodiment, the filter 33 is provided in the connecting pipe 30, of course, the filter 33 can be provided in any one of the first cavity 26, the second cavity 27, the hot water channel 15 and the cold water channel 16.

In the embodiment, there are two seal rings 24 provided on the pipe joint 20 for sealing the joint place between the hot water channel 14 and the first cavity 26 and the joint place between the cold water channel 15 and the second cavity 27 respectively to avoid water leakage. Specifically, two circular sealing grooves including a big circular sealing groove 212 and a small circular sealing groove 213 are provided on the end face of the interface end of the pipe joint 20, the hot water channel 14 is located inside, the cold water channel 15 is located outside, the small circular sealing groove 213 surrounds the inner hot water channel 14, and the big circular sealing groove 212 surrounds the outer cold water channel 15; there are also two seal rings 24 including a big seal and a small seal, wherein the big seal ring is provided in the big circular sealing groove 212, and the small seal ring is provided in the small circular sealing groove 213.

In the embodiment, the structure of the connecting pipe 30 is identical with the first embodiment, the first assembly or replacement of the tap body 10 also adopts the method described in the first embodiment, which is simple and fast, and are not described in detail herein.

In the embodiment, the lower end of the first cavity 26 is arranged in parallel with the lower end of the second cavity 27, it should be noted that the directions of the lower opening of the first cavity 26 and the lower opening of the second cavity 27 can also be changed according to actual assembly requirements.

Meanwhile, it should be noted that when the hot and cold water dual-use tap is used by a user, no matter how the first cavity 26 and the second cavity 27 are connected with the cold water channel and the hot water channel, only the second cavity 27 located outside needs to be sealed so that only the cold water flows from the first cavity 26 if the dual-use tap needs to be modified into a single cold water tap. In this way, the modification can be completed by only adding a sealing device on the base of the primary tap, and there is no need to change a new single cold water tap. In the embodiment, there is also no need to change a new pipe joint 20, the single cold water tap can be mounted on the pipe joint 20 shown in FIG. 9 or on the pipe joints 20 shown in FIG. 2, FIG. 7 and FIG. 8.

Embodiment Five

Figure 10:
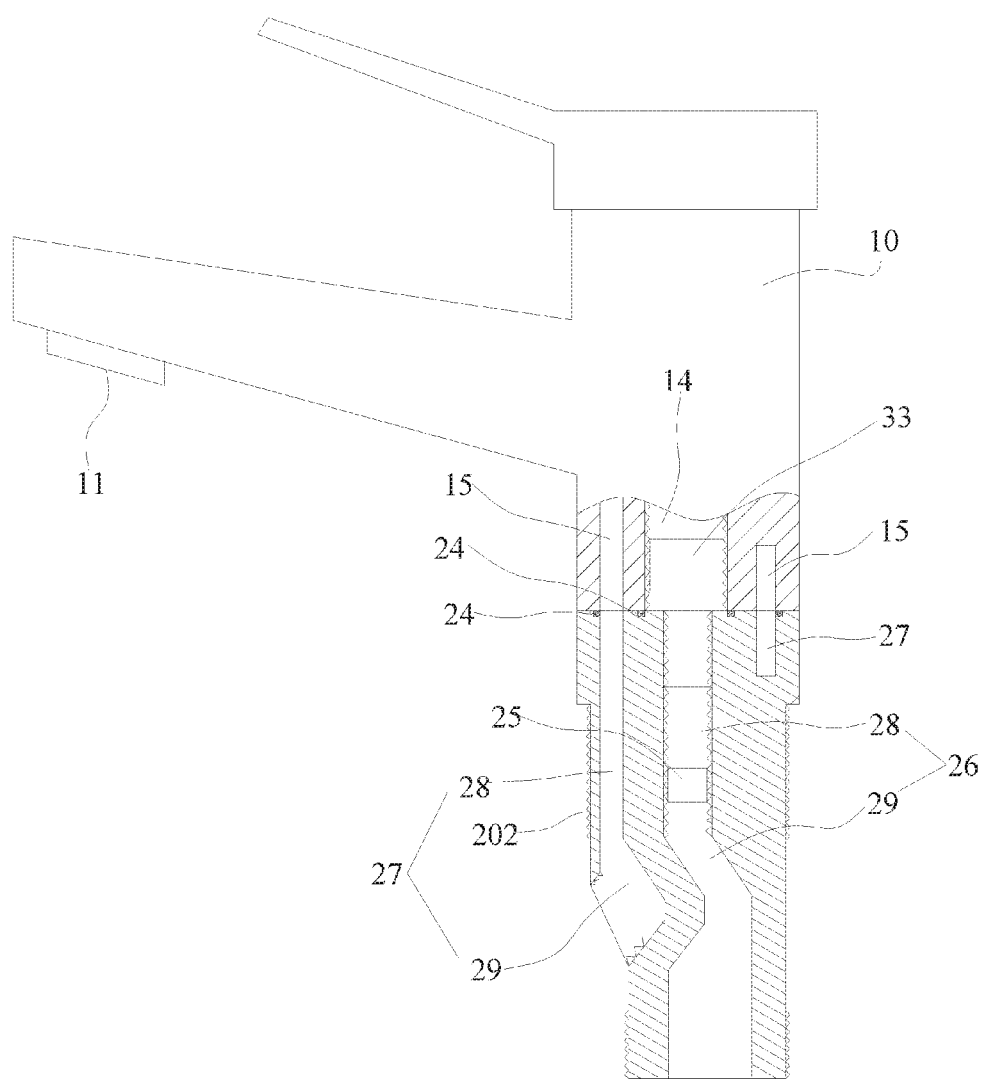
FIG. 10 is a cut view of an easy-to-install tap structure in a fifth embodiment of the invention.

Referring to FIG. 10, a fifth embodiment of the invention provides a tap structure, compared with the fourth embodiment, the connecting pipe 30 has a different structure. In the embodiment, the structure of the connecting pipe 30 is similar to the structure of the connecting pipe 30 in the second embodiment, and is not described in detail herein. The structure of a tap body 10 of the embodiment is similar to the one in the fourth embodiment, and is not described in detail herein.

Embodiment Six

Figure 11:
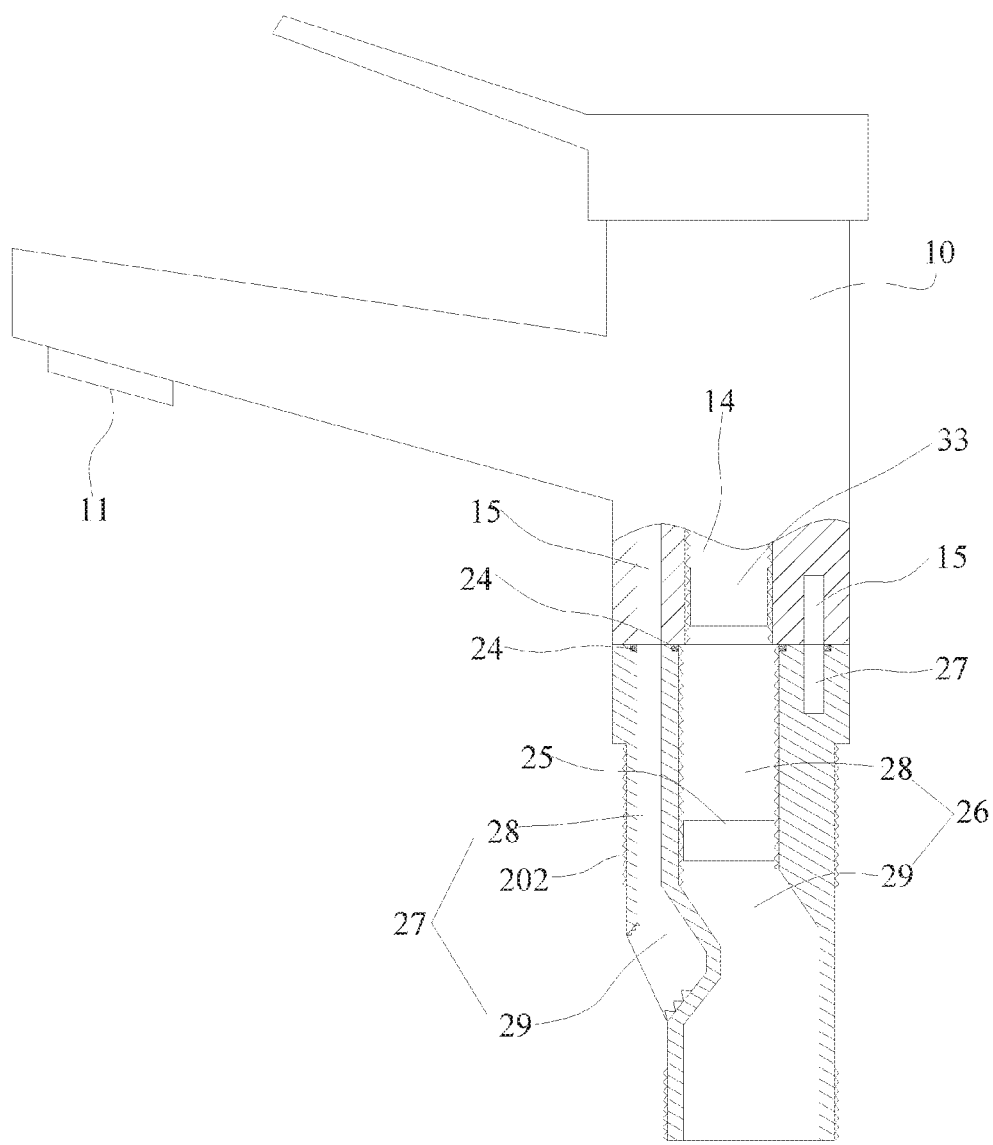
FIG. 11 is a cut view of an easy-to-install tap structure in a sixth embodiment of the invention.

Referring to FIG. 11, a sixth embodiment of the invention provides a tap structure, compared with the fourth embodiment, the connecting pipe 30 has a different structure. In the embodiment, the structure of the connecting pipe 30 is similar to the structure of the connecting pipe 30 in the third embodiment, and is not described in detail herein. The structure of a tap body 10 of the embodiment is similar to the one in the fourth embodiment, and is not described in detail herein. In the embodiment, a filter 33 is provided in the connecting pipe 30. Of course, the filter 33 can be also provided in any one of the first cavity 26, the second cavity 27, the hot water channel 15 and the cold water channel 16.

Embodiment Seven

Figure 12:
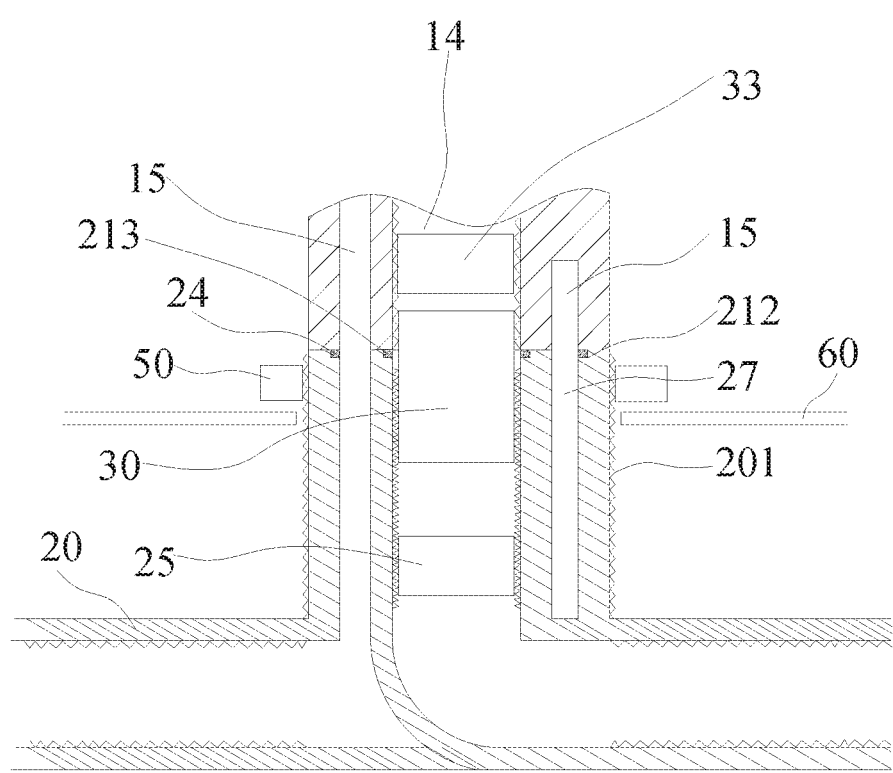
FIG. 12 is a partial cut view of an easy-to-install tap structure in a seventh embodiment of the invention.

Referring to FIG. 12, in this embodiment, on the basis of the fourth embodiment as shown in FIG. 9, the bottom of the first cavity 26 is turned to the left, such that the top of the first cavity 26 forms an angle of 90 degrees with the bottom of the first cavity 26, that is, the first cavity 26 is in an L shape. Meanwhile, the bottom of the second cavity 27 is turned to the right such that the top of the second cavity 27 forms an angle of 90 degrees with the bottom of the second cavity 27, that is, the second cavity 27 is in an L shape. In this way, the bottom opening of the first cavity 26 is in an opposite direction but collinear with the bottom opening of the second cavity 27, a fifth outer thread 201 for cooperating with the external nut to assemble is provided on the outer wall of the connecting pipe 20. The tap structure is suitable for a wall-hung hot and cold shower tap. The first cavity 26 and the second cavity 27 of the pipe joint 20 are connected with a cold water supplying pipe and a hot water supplying pipe respectively.

During the assembly of the wall-hung hot and cold shower tap, the pipe joint 20 is firstly fixed in a wall groove by a screw such that the interface end 21 of the pipe joint 20 is parallel with the wall surface and is projected out of the wall surface, the wall groove is filled up with cement mortars and ceramic chips 60. A decorative nut 50 is screwed onto the pipe joint 20, the decorative nut 50 can cover joint gaps between the pipe joint 20 and ceramic chips 60 to provide a decorative effect and also provide a reinforce effect for the pipe joint 20. The auxiliary element 25 is then screwed into the pipe joint 20, and the seal 24 and connecting pipe 30 are put into the pipe joint 20. The connecting pipe 30 can be shaped as a sleeve as in the first embodiment, or as a stepped connecting pipe as in the second or third embodiment. The connecting pipe 30 is then rotated and adjusted until the tap body (not shown in FIG. 12) faces directly downward. Thus the tap body is removed and the filter 33 is put into the tap body, the tap body is tightened to the original position, and finally a shower rose is connected to the tap body. The wall-hung hot and cold shower tap in the present embodiment, compared with a traditional wall-hung cold and hot water dual-use shower tap, reduces many accessories obviously at first; furthermore, during the assembly of a traditional wall-hung cold and hot water dual-use shower tap, there is a certain distance requirement between interfaces of the cold water supplying pipe and the hot water supplying pipe, wherein the distance is generally required to range from 9 cm to 25 cm for assembly. Different interface distances will cause appearance differences after assembly of the same product. However, in the preset embodiment, when the first cavity 26 and the second cavity 27 are connected to the cold water supplying pipe and the hot water supplying pipe respectively, there is no need to consider the problem of the interface distance between the cold water supplying pipe and the hot water supplying pipe, and it is only required to connect the cold water supplying pipe and the hot water supplying pipe with the first cavity 26 and the second cavity 27 respectively. Besides, in the embodiment, the interface end 21 of the pipe joint 20 is directly communicated, and the tap body connected to the pipe joint 20 is also directly communicated, the volume thereof is obviously smaller than a traditional branched tap. During the replacement of the tap body or a tap body with more functions, it can be mounted to the previous pipe joint 20 if only the connection structure is not changed. Therefore, when the present embodiment is compared with the traditional wall-hung cold and hot water dual-use shower tap, the overall cost is saved, and the assembly is obviously convenient and environmental.

Embodiment Eight

Figure 13:
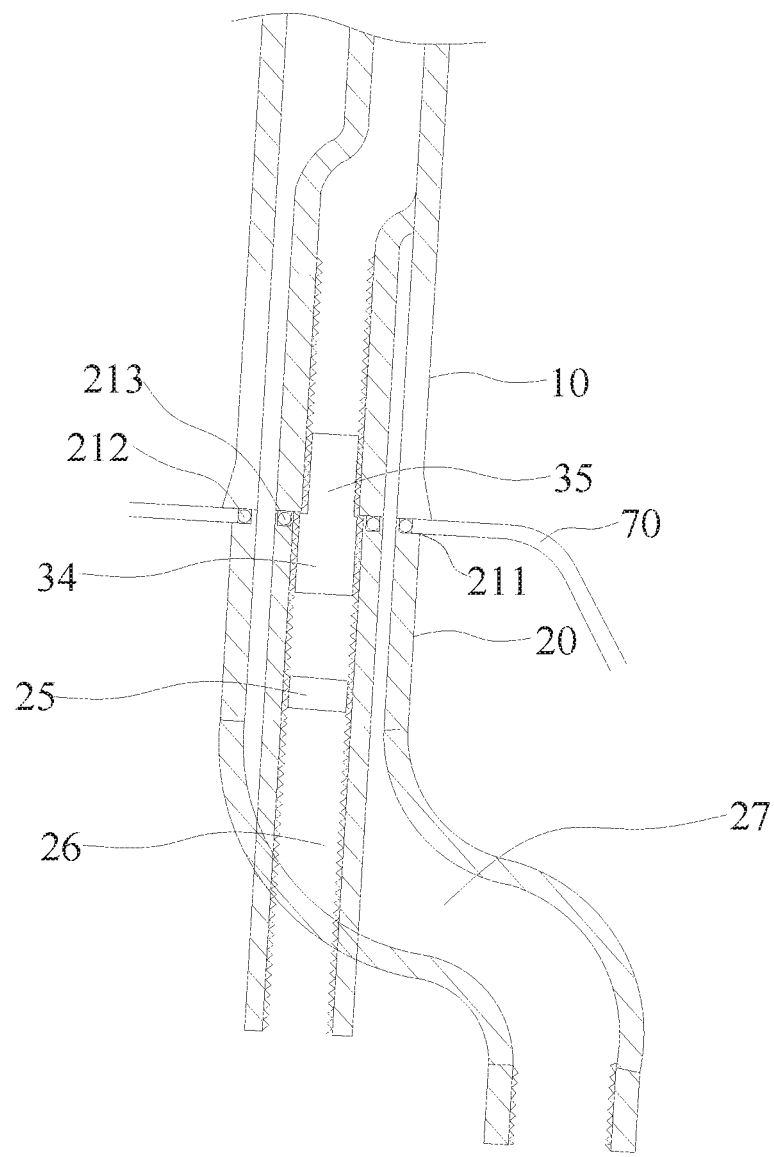
FIG. 13 is a partial cut view of an easy-to-install tap structure in an eighth embodiment of the invention.

Referring to FIG. 13, in this embodiment, on the basis of the fourth embodiment as shown in FIG. 9, a ring of bayonet 211 is annularly provided on the outer wall of the pipe joint 20, such that the bayonet 211 can be welded with the metal basin conveniently. During the welding process, edges of the metal basin are engaged in the bayonet 211, such that the end face of the metal basin is located on the same plane as the end face of the pipe joint 20, but the plane has an angular inclination relative to the horizontal plane, water is not prone to accumulate, which is cleaner. The tap body, especially the one with a trisquare shape, is easy to mount, and thus there is larger operating space during the rotation assembly near a wall. The solution can also be adopted during the assembly of the pipe joint 20 in the first embodiment to the metal basin.

Embodiment Nine

Figure 14:
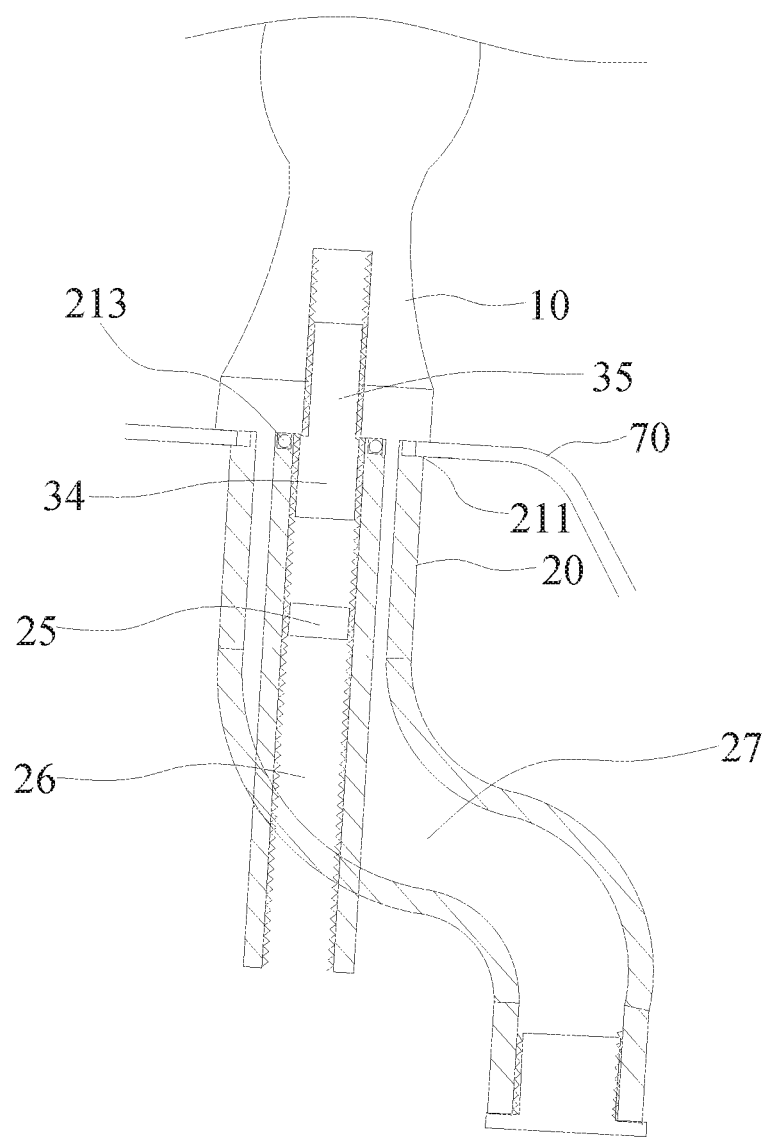
FIG. 14 is a partial cut view of an easy-to-install tap structure in a ninth embodiment of the invention.

Referring to FIG. 14, the embodiment is on the basis of FIG. 13, according to requirements the cold and hot water dual-use tap can be removed directly and replaced by a single cold use tap if only cold water is needed; now, the bottom part of the basin does not need to be removed, while only the outer second cavity needs to be blocked; the big seal ring is not needed at this time and the sealing can be completed by only a small seal ring. The filter can be provided in the single cold water tap or in the pipe joint. Therefore, adoption of the tap body structure of the embodiment is not only convenient for the first assembly but also for subsequent modifications.

Embodiment Ten

Figure 15:
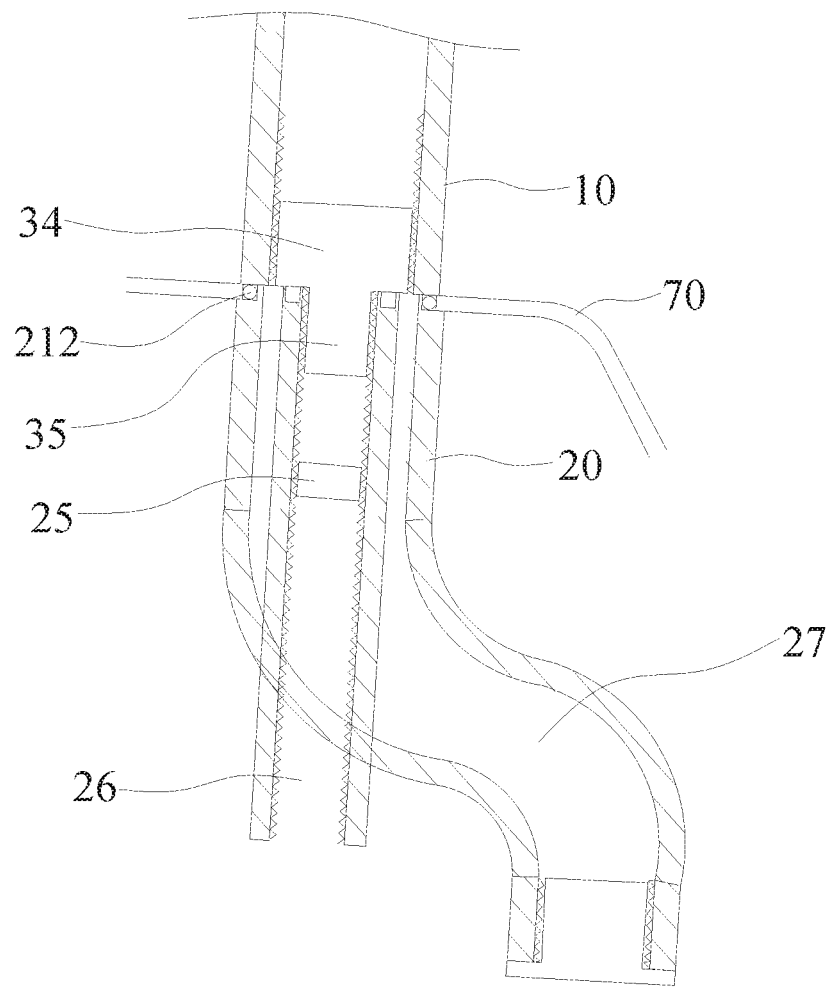
FIG. 15 is a partial cut view of an easy-to-install tap structure in a tenth embodiment of the invention.

Referring to FIG. 15, the embodiment is on the basis of FIG. 13, according to requirements the cold and hot water dual-use tap can be removed directly and replaced by a single cold use tap if only cold water is needed, meanwhile, the pipe diameter of the single cold water tap body is bigger than the pipe diameter of the pipe joint 20; now, the bottom part of the basin does not need to be removed, the sealing between the single cold water tap body and the pipe joint 20 can be realized by the big seal ring, and the small seal ring has no effect; however, the small seal does not need to be removed in actual operation, while only the outer second cavity needs to be blocked. Similarly, at this time, the filter can be provided in the single cold water tap or in the pipe joint.

Embodiment Eleven

Figure 16:
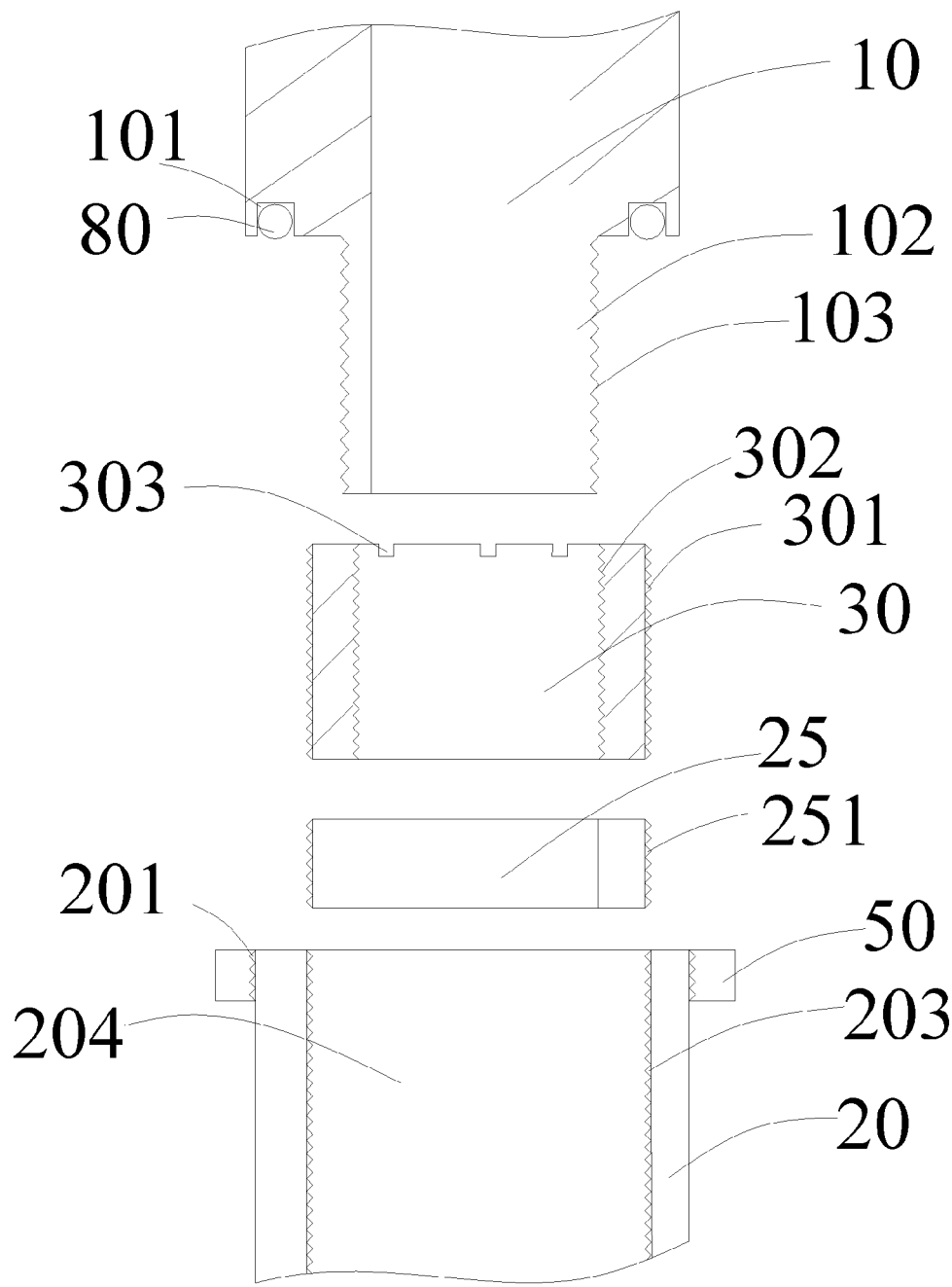
FIG. 16 is a partial cut view of an easy-to-install tap structure in an eleventh embodiment of the invention.

Referring to FIG. 16, compared with the first embodiment, this embodiment has the difference in that the structure of the connecting pipe 30 is different, and the structures of the tap body 10 and pipe joint 20 corresponding to the connecting pipe 30 have some differences. Specifically, the tap structure comprises a tap body 10 and a pipe joint 20 and further comprises a connecting pipe 30 provided inside the pipe joint 20, the connecting pipe 30 is configured for connecting the tap body 10 with the pipe joint 20, the tap body 10 has a connection end 102, a first outer thread 103 is provided on the connection end 102, the pipe joint 20 has an interface end 204, the connecting pipe 30 is connected in the pipe joint 20, a first inner thread 203 is provided on the inner wall of the interface end 204, the connecting pipe 30 comprises a second outer thread 301 outside and a second inner thread 302 inside, the first outer thread 103 on the connection end 102 is connected with the second inner thread 302 on the connecting pipe 30, and the second outer thread 301 on the connecting pipe 30 is connected with the first inner thread 203 on the interface end 204; an auxiliary element 25 for assisting the assembly of the tap body 10 is provided in the interface end 204 of the pipe joint 20, the function of the auxiliary element 25 is identical with that described in the above another embodiments, the auxiliary element 25 has a third outer thread 251 matching with the first inner thread 203, the connecting pipe 30 has a first end and a second end opposite to the second end, the auxiliary element 25 is located in the vicinity of the second end of the connecting pipe 30, and a plurality of recesses 303 for facilitating assembly and facilitating adjusting the relative position between the tap body 10 and the pipe joint 20 are provided on an end face of the first end of the connecting pipe 30. The recesses 303 are provided in such a way that the assembly and the adjustment of the relative position between the tap body 10 and the pipe joint 20 can be realized by a screwdriver, meanwhile, a socket through which auxiliary tools can be inserted to drive the auxiliary element 25 to rotate is provided on an end of the auxiliary element 25 away from the second end of the connecting pipe.

In the embodiment, the connecting pipe 30 is shaped as a straight sleeve, the connecting pipe 30 is hidden in the pipe joint 20, meanwhile an end face of the interface end 204 of the pipe joint 20 is abutted against the tap body 10. A containing slot 101 for containing the seal ring 80 is concavely provided on an end face of the tap body 10 corresponding to the end face of the interface end 204 of the pipe joint 20.

In the embodiment, the pipe joint 20 is a straight pipe, of course, the pipe joint 20 can also be a three-way pipe or a bending pipe. A fifth outer thread 201 configured to be connected with a decorated nut 50 can be also provided on the outer wall of the pipe joint 20.

Foregoing contents are some preferable embodiments of the present invention merely, and are not regarded as being limitation to the protection scope of the present invention, within the spirit and principles disclosed in the present invention, any modification, equivalent replacement and amendment should fall within the protection scope of the present invention.

The invention claimed is:

1. A tap structure comprising a tap body and a pipe joint, wherein the tap structure further comprises a connecting pipe arranged inside the tap body and the pipe joint and connecting the tap body with the pipe joint, the tap body has a connection end, a first inner thread is provided on the connection end, the pipe joint has an interface end, a second inner thread is provided in the interface end, a first outer thread and a second outer thread are provided on a first end and a second end of the connecting pipe respectively, the first outer thread is connected with the first inner thread, the second outer thread is connected with the second inner thread, an end face of the connection end of the tap body is abutted against an end face of the interface end of the pipe joint; and wherein an auxiliary element configured for assisting the mounting of the tap body is provided in the interface end of the pipe joint, the auxiliary element has a third outer thread matching with the second inner thread, the auxiliary element is located in the vicinity of the second end of the connecting pipe, a socket through which an auxiliary tool is allowed to be inserted to drive the auxiliary element is provided on an end of the auxiliary element away from the second end of the connecting pipe.

2. The tap structure according to claim 1, wherein the connecting pipe is shaped as a straight sleeve, thread pitches of the first outer thread and the second outer thread are different, and a spacing is provided between the second inner thread and the end face of the interface end.

3. The tap structure according to claim 2, wherein a bayonet configured to be welded with a metal basin is annularly provided on an outer wall of the pipe joint.

4. The tap structure according to claim 2, wherein each of the first cavity and the second cavity includes a straight cavity section and a corner section connected to the bottom of the straight cavity section, the second inner thread extends to the bottom of the straight cavity section.

5. The tap structure according to claim 1, wherein the connecting pipe has a big end and a small end, the first outer thread is provided on the big end and the second outer thread is provided on the small end, or, the first outer thread is provided on the small end and the second outer thread is provided on the big end.

6. The tap structure of claim 5, wherein thread pitches of the first outer thread and the second outer thread are different.

7. The tap structure according to claim 1, wherein the tap body has a hot water channel and a cold water channel independent from each other, the pipe joint has a first cavity and a second cavity independent from each other, the first cavity is provided correspondingly to the hot water channel, and the second cavity is provided correspondingly to the cold water channel.

8. The tap structure according to claim 7, wherein the second cavity is flared from bottom to top, a top opening of the second cavity is circular, the cold water channel is flared from top to bottom, and a bottom opening of the cold water channel is circular and connected to a top opening of the second cavity.

9. The tap structure according to claim 7, wherein an annular sealing groove is provided on the end face of the interface end of the pipe joint, and the annular sealing groove is filled up with a seal ring.

10. The tap structure according to claim 9, wherein there are two annular sealing grooves including a big circular sealing groove and a small circular sealing groove, one channel of the hot water channel and the cold water channel is located inside, and the other channel is located outside, the small circular sealing groove surrounds the inside channel, and the big circular sealing groove surrounds the outside channel; there are two sealing rings including a big seal ring and a small seal ring, the big seal ring is provided in the big circular sealing groove, and the small seal ring is provided in the small circular sealing groove.

11. The tap structure according to claim 7, wherein a filter is provided in any one of the first cavity, the second cavity, the hot water channel and the cold water channel.

12. The tap structure according to claim 1, wherein a fifth outer thread cooperated with a decorated nut for assembly is provided on an outer wall of the pipe joint.

13. A tap structure comprising a tap body and a pipe joint, wherein the tap structure further comprises a connecting pipe provided inside the pipe joint and connecting the tap body with the pipe joint, the tap body has a connection end, a first outer thread is provided on the connection end, the pipe joint has an interface end, a first inner thread is provided on the interface end, the connecting pipe comprises a second outer thread located outside and a second inner thread located inside, the first outer thread is connected with the second inner thread, the second outer thread is connected with the first inner thread, the connecting pipe has a first end and a second end opposite to the second end; the connecting pipe is hidden in the pipe joint, and an end face of the interface end of the pipe joint is abutted against the tap body; and wherein an auxiliary element assisting the assembly of the tap body is provided in the interface end of the pipe joint, the auxiliary element has a third outer thread matching with the first inner thread, the auxiliary element is located in the vicinity of the second end of the connecting pipe, a plurality of recesses configured for assembly and adjusting the relative position between the tap body and the pipe joint are provided on an end face of the first end of the connecting pipe, a socket through which an auxiliary tool is allowed to inserted to drive the auxiliary element to rotate is provided on an end of the auxiliary element away from the second end of the connecting pipe.

14. The tap structure of claim 13, wherein the connecting pipe is in a shape of a straight sleeve.

15. The tap structure of claim 14, wherein a containing slot for containing the seal ring is concavely provided on an end face of the tap body corresponding to the end face of the interface end of the pipe joint.

16. The tap structure of claim 15, wherein the pipe joint is a three-way pipe or a bending pipe.

17. The tap structure of claim 16, a fifth outer thread configured to be connected with a decorated nut is provided on an outer wall of the pipe joint.

\* \* \* \* \*